United States Patent Office 2,941,589
Patented June 21, 1960

2,941,589

PROCESS OF REDUCING SURFACE INCRUSTATION BY SALT CRYSTALS DURING EVAPORATION OF BRINE SOLUTIONS

Carl E. Johnson Westchester, Ill., assignor to Nalco Chemical Company, a corporation of Delaware No Drawing. Filed May 29, 1953, Ser. No. 358,535

7 Claims. (Cl. 159—47)

This invention relates to a method of treating brine solutions and more particularly to a method of treated concentrated brine solutions in order to prevent incrustation caused by crystal formation at the surface of a brine which is being evaporated.

One of the objects of the invention is to provide a new and improved method of treating brine solutions in order to prevent surface incrustation.

A further object of the invention is to provide a new and improved method of treating brine solutions during evaporation to prevent crystals from forming on the surface of the brine being evaporated and thereby reduce the evaporating surface and lower the rate of evaporation. Other objects will appear hereinafter.

These objects are accomplished in accordance with the invention by adding to a brine solution which is to be evaporated a fraction of a percent by weight of the solution of a compound from the class consisting of polyoxyalkylene polyols having a terminal hydroxyl group attached to a terminal carbon atom at opposite ends of a polyoxyalkylene linear chain, their aliphatic monoethers wherein one of said terminal hydroxyl groups is replaced by an ether group, their aliphatic diethers wherein two of said terminal hydroxyl groups are replaced by ether groups and aliphatic mono- and diamine condensation products wherein a hydrogen atom of a primary or secondary amine is reacted with one or two of said terminal hydroxyl groups with the elimination of water and which are characterized by polyoxyalkylene chains containing all oxyethylene groups or heteric oxyethylene and oxypropylene groups, or all oxypropylene groups, and have an average molecular weight such that the portion thereof attributable to oxyalkylene groups is at least 500, with the further proviso that the said compound is substantially insoluble in the brine solution under the conditions of evaporation. Where the compounds employed for the purpose of the invention contain both oxyethylene and oxypropylene groups they are referred to herein as "heteric" compounds. The average molecular weights of the preferred compounds employed for the purpose of the invention are within the range of 1000 to 10,000. The best results have been obtained with polyoxyalkylene polyols having a weight ratio of oxyethylene groups to oxypropylene groups in the range of about 1:22 to about 3:1 and an average molecular weight of about 2000 to 7000.

Heteric polyoxyalkylene diols which are suitable for the practice of the invention are described in Toussaint et al. U. S. 2,425,845. Monoethers of heteric polyoxyalkylene diols which are suitable for the purpose of the invention are described in Roberts et al. U.S. 2,445,755. Diethers of heteric polyoxyalkylene diols suitable for the purpose of the invention are described in Roberts et al., U.S. 2,520,611. Aliphatic amine derivatives of polyoxyalkylene diols suitable for the practice of the invention are obtained by reacting ethylene oxide or mixtures of ethylene oxide and 1,2-propylene oxide with primary and secondary amines.

The preparations of amine derivatives of alkylene oxides has been described by Horne and Shriner (J.A.C.S. 54, 2925 (1932)) who passed ethylene oxide into a mixture of diethyl amine dissolved in methanol. Although the chief product of the reaction was diethylaminoethanol, the authors state that higher molecular weight compounds were also obtained. Headlee, et al (J.A.C.S. 55, 1066 (1933)) continued this work and found that the yield of polymeric material could be increased by using an autoclave and higher molar ratios of ethylene oxide to amine. Schwoegler, U.S. 2,337,004 and 2,373,199, disclosed the preparation of amine derivatives by heating an aliphatic primary or secondary amine with an equivalent amount of anhydrous alkylene oxide or by using a high ratio of amine to oxide (15:1) at 1600 pounds per square inch. German Patent 667,744 discloses the heating of one mol of primary or secondary aliphatic amines with 12 mols of alkylene oxide in the presence of a small amount of caustic alkali.

Suitable compositions for the practice of the invention can also be prepared by starting with a high molecular weight polyoxypropylene glycol and adding thereto various amounts of ethylene oxide, for example, starting with polyoxypropylene glycol having a molecular weight of 1000, enough ethylene oxide can be added to produce a product having a molecular weight of 2000 to 7000. Similarly, starting with a polyoxypropylene glycol having a molecular weight of 1800, enough ethylene oxide can be added thereto to produce a product having a molecular weight of 2000 with a mol ratio of propylene oxide to ethylene oxide of 31:4.5. Alternatively, with a polyoxypropylene glycol having a molecular weight of 1800, enough ethylene oxide can be added to produce a product having a molecular weight of 3600 with a mol ratio of propylene oxide to ethylene oxide of approximately 31:41. Another alternative is to start with a polyoxypropylene glycol having a molecular weight of 1800 and add enough ethylene oxide to produce a final product having an average molecular weight of 7000 with a mol ratio of propylene oxide to ethylene oxide of 31:118. Another product which can be prepared for the practice of the invention is made by reacting polyoxypropylene glycol 1200 with ethylene oxide until the final molecular weight is between 2000 and 7000. Another composition suitable for the practice of the invention can be made by starting with polyoxypropylene glycol 2000 and adding 2 to 12 mols of ethylene oxide.

A product prepared from 35 mols of propylene oxide and 2 to 12 mols, preferably 4 mols of ethylene oxide has been found especially useful in the practice of the invention for the prevention of the formation of crystals on the surface of salt grainers where flake salt is manufactured. These grainers are simple open evaporation boxes where the vapor goes to the atmosphere rather than in various stages as is the case with multiple effect evaporators.

In the practice of the invention the polyoxyalkylene derivatives previously described are preferably incorporated into a carrier in order to disperse them properly and in suitable amounts because the amounts required are very small. The compositions may be dispersed in a liquid carrier or they may be prepared by suspending them on a powder. In either case, the carrier should be one which does not produce harmful contamination of the saline solution being treated. Examples of suitable carriers are ethyl alcohol, propyl alcohol, butyl alcohol, amyl alcohol, hexyl alcohol, mixtures of branched chain lower aliphatic alcohols, including for example, alcohol mixtures formed by the hydrogenation of carbon monoxide, ethylene glycol, diethylene glycol, the monobutylether of ethylene glycol, the monobutylether of diethylene glycol, and/or water.

The following examples are given to illustrate specifically the polyoxyalkylene derivatives which can be employed satisfactorily in the practice of the invention.

*Example I*

The polyoxyalkylene glycol with an ethylene oxide to 1,2-propylene oxide ratio of 1:9 having a viscosity of 506 S.U.S. (Sayboldt Universal Seconds) at 100° F. (Ucon 10 HDG–506, Carbide and Carbon Chemicals Corporation.)

*Example II*

A polyoxyalkylene glycol with an ethylene oxide to 1,2-propylene oxide ratio of 1:3 having a viscosity of 510 S.U.S. at 100° F. (Ucon 25 HDG–510.)

*Example III*

A polyoxyalkylene glycol with an ethylene oxide to 1,2-propylene oxide ratio of 1:3 having a viscosity of 2005 S.U.S. at 100° F. (Ucon 25 H–2005.)

*Example IV*

A polyoxyalkylene glycol with an ethylene oxide to 1,2-propylene oxide ratio of 2:3 having a viscosity of 499 S.U.S. at 100° F. (Ucon 40 HDG–499.)

*Example V*

A polyoxyalkylene glycol with an ethylene oxide to 1,2-propylene oxide ratio of 1:1 and one terminal dibutylamine group, having a viscosity of 588 S.U.S. at 100° F. (Ucon 50 HDBA–588.) This compound was prepared by reacting an equimolar mixture of ethylene oxide and 1,2-propylene oxide with dibutylamine.

*Example VI*

The monobutyl ether of a polyoxyalkylene glycol having an ethylene oxide to 1,2-propylene oxide ratio of 1:1 and having a viscosity of 55 S.U.S. at 100° F. (Ucon 50 HB–55.)

*Example VII*

The monotetradecyl ether of a polyoxyalkylene glycol having an ethylene oxide to 1,2-propylene oxide ratio of 1:1 and having a viscosity of 761 S.U.S. at 100° F. (Ucon 50 HTD–761.)

*Example VIII*

The monomethyl ether of a polyoxyalkylene glycol having an ethylene oxide to 1,2-propylene oxide ratio of 1:1 and having a viscosity of 1277 S.U.S. at 100° F. (Ucon 50 HM–1277.)

*Example IX*

The monobutyl ether of a polyoxyalkylene glycol having an ethylene oxide to 1,2-propylene oxide ratio of 1:1, and having a viscosity of 5100 S.U.S. at 100° F. (Ucon 50 HB–5100.)

*Example X*

The dibutyl amine of a polyoxyalkylene glycol having an ethylene oxide to 1,2-propylene oxide ratio of 1:1, and having a viscosity of 607 S.U.S. at 100° F. (Ucon 50 HBA–607).

*Example XI*

A polyoxyalkylene glycol with an ethylene oxide to 1,2-propylene oxide ratio of 1:9 having a viscosity of 373 S.U.S. at 100° F. and a molecular weight of approximately 1150. (Ucon 10 HDG–373.)

*Example XII*

A polyoxyalkylene glycol with an ethylene oxide to 1,2-propylene oxide ratio of 1:9 having a viscosity of 700 S.U.S. at 100° F. and a molecular weight of approximately 2100. (Ucon 10 HDG–700.)

*Example XIII*

A polyoxyalkylene glycol with an ethylene oxide to 1,2-propylene oxide ratio of 1:9 having a viscosity of 1682 S.U.S. at 100° F. and an approximate molecular weight of 3600. (Ucon 10 HDG–1682.)

*Example XIV*

A polyoxyalkylene glycol with an ethylene oxide to 1,2-propylene oxide ratio of 1:3 having a viscosity of 876 S.U.S. at 100° F. and an approximate molecular weight of 2200. (Ucon 25 HDG–876.)

*Example XV*

A polyoxyalkylene glycol with an ethylene oxide to 1,2-propylene oxide ratio of 1:3 having a viscosity of 1156 S.U.S. at 100° F. and an approximate molecular weight of 2600. (Ucon 25 HDG–1156.)

*Example XVI*

A polyoxyalkylene glycol with an ethylene oxide to 1,2-propylene oxide ratio of 1:3 having a viscosity of 2157 S.U.S. at 100° F. and an approximate molecular weight of 4000. (Ucon 25 HDG–2157.)

*Example XVII*

A polyoxyalkylene glycol with an ethylene oxide to 1,2-propylene oxide ratio of 2:3 having a viscosity of 755 S.U.S. at 100° F. and an approximate molecular weight of 1850. (Ucon 40 HDG–755.)

*Example XVIII*

A polyoxyalkylene glycol with an ethylene oxide to 1,2-propylene oxide ratio of 2:3 having a viscosity of 1026 S.U.S. at 100° F. and an approximate molecular weight of 2250. (Ucon 40 HDG–1026.)

*Example XIX*

A polyoxyalkylene glycol with an ethylene oxide to 1,2-propylene oxide ratio of 2:3 having a viscosity of 1703 S.U.S. at 100° F. and an approximate molecular weight of 3100. (Ucon 40 HDG–1703.)

*Example XX*

A polyoxyalkylene glycol with an ethylene oxide to 1,2-propylene oxide ratio of 2:3 having a viscosity of 2412 S.U.S. and an approximate molecular weight of 3800. (Ucon 40 HDG–2412.)

*Example XXI*

The monobutylether of a polyoxyalkylene glycol having an ethylene oxide to 1,2-propylene oxide ratio of 3:2 and having a viscosity of 5100 S.U.S. at 100° F. (Ucon 60 HB–5100.)

*Example XXII*

The monomethylether of a polyoxyalkylene glycol with an ethylene oxide to 1,2-propylene oxide ratio of 1:1 having a viscosity of 691 S.U.S. at 100° F. and an approximate molecular weight of 1600. (Ucon 50 HM–691.)

*Example XXIII*

The monotetradecylether of a polyoxyalkylene glycol with an ethylene oxide to 1,2-propylene oxide ratio of 1:1 having a viscosity of 1294 S.U.S. at 100° F. and a molecular weight of approximately 2192. (Ucon 50 HTD–1294.)

*Example XXIV*

A polyoxyalkylene glycol with an ethylene oxide to 1,2-propylene oxide ratio of 3:1 having a viscosity of 1400 S.U.S. at 100° F. (Ucon 75 H–1400.)

*Example XXV*

A polyoxyalkylene glycol with an ethylene oxide to 1,2-propylene oxide ratio of 3:1 having a viscosity of approximately 63,000 S.U.S. at 100° F. (Ucon 75 H–63,000.)

Example XXVI

A polyoxyalkylene glycol with a weight ratio of ethylene oxide to 1,2-propylene oxide of 3:1 having a viscosity of approximately 3,000 S.U.S. at 100° F. and a molecular weight of approximately 7000. (Ucon 75 H-3000.)

Example XXVII

A polyoxypropylene glycol of average approximate molecular weight of 1000.

Example XXVIII

A polyoxypropylene glycol of average approximate molecular weight of 1200.

Example XXIX

A polyoxypropylene glycol of average molecular weight of 2025.

Example XXX

A polyoxypropylene glycol of average molecular weight of approximately 2700.

Example XXXI

A monobutylether of a polyoxypropylene glycol having a viscosity of 385 S.U.S. at 100° F. (Ucon LB–385.)

Example XXXII

A monobutylether of a polyoxypropylene glycol having a viscosity of 613 S.U.S. at 100° F. and having an average approximate molecular weight of 1550. (Ucon LB–613X.)

Example XXXIII

A monobutylether of a polyoxypropylene glycol having a viscosity of 1145 S.U.S. at 100° F. and an approximate molecular weight of 3300. (Ucon LB–1145.)

Example XXXIV

A polyoxypropylene glycol having a viscosity of 135 S.U.S. at 100° F. (LB–135.)

Example XXXV

In Examples V and X the butylamine and dibutylamine employed in making the respective compositions can be replaced by other aliphatic amines, as, for example, ethylamine and diethylamine, propylamine and dipropylamine, amylamine and diamylamine, and their higher homologues.

Example XXXVI

The composition obtained by reacting 4 mols of ethylene oxide wtih a polyoxypropylene glycol derived from 35 mols of 1,2-propylene oxide.

Example XXXVII

A composition obtained by reacting polyoxypropylene glycol 1800 with sufficient ethylene oxide to produce a composition having a molecular weight of about 2000.

Example XXXVIII

A composition obtained by reacting polyoxypropylene glycol 1800 with sufficient ethylene oxide to produce a composition having a molecular weight of about 3600.

The following examples illustrate the preparation of compositions which have proven to be very effective in actual use for preventing crystal formation at the surface of such solutions during evaporation thereof, but it will be understood that the invention in its broader aspects is not limited to these specific compositions.

Example XXXIX

The following ingredients were mixed together.

| Ingredient: | Parts by weight |
| --- | --- |
| Ucon 25 H–2005 | 25 |
| Pentasol | 5 |
| Dipropylene glycol | 70 |

The above composition was added to a grainer where flake salt was being manufactured at the rate of 50 to 100 cc. every 8 hours. The grainer in this case was a larger evaporation tank which was open to the atmosphere. The added composition was effective in preventing the crystals from forming on the surface of the evaporator. Without the addition of the composition the crystals of salt formed on the evaporating surface and lowered the rate of evaporation. In this case, the composition of the invention functions to prevent incrustation caused by the accumulation of salt crystals.

Example XL

Instead of the composition of Example XXXIX the following composition was added to the grainer in approximately the same proportions.

| Ingredient: | Parts by weight |
| --- | --- |
| A product obtained by adding 4 mols of ethylene oxide to a polyoxypropylene glycol made from 35 mols of 1,2-propylene oxide | 25 |
| Pentasol | 5 |
| Dipropylene glycol | 70 |

Excellent results were obtained in preventing the accumulation of salt crystals on the surface of the grainer. The composition used in this example accomplished the desired result with smaller quantities (or fewer additions of the same quantities) than the composition employed in Example XXXIX.

In the foregoing examples "Pentasol" is the trade name for a synthethically produced mixture of alcohols containing approximately 70% of 1-pentanol, 3-methyl-1-butanol and 2-methyl-1-butanol, the remaining 30% consisting essentially of 2-pentanol and 3-butanol.

The specific gravity of this composition at 20° C./20° C. is 0.81–0.82. The refractive index at 20° C. is 1.409 and the surface tension is 37.7 dynes per centimeter.

In general, the invention is especially useful where the concentration of salts in the aqueous solutions are at least 5% by weight of the solutions and especially good results have been obtained in the treatment of saturated solutions or substantially saturated solutions during the crystallization of salts from such solutions.

While the invention is not limited to any theory, it is believed that the compounds employed for the purpose of the invention are effective because the high concentrations of alkali metal ions in the saline solutions decrease the water solubility of the polyoxyalkylene derivatives. High temperatures also tend to decrease the water solubility of such derivatives but many of these polyoxyalkylene derivatives are not effective in process antifoam applications at temperatures of 150° F. to 210° F. ordinarily employed in evaporations and crystallizations. The combination of moderately high temperatures within the range of 150° F. to 210° F. and high alkali metal ion concentrations apparently produces water insolubility in many of the polyoxyalkylene derivatives which are normally soluble in water at ordinary temperatures or even at temperatures below the boiling point of water.

The invention is very advantageous in minimizing surface incrustation in salt grainers or in crystallizing operations where salts are crystallized from aqueous solutions.

The invention is hereby claimed as follows:

1. A process of reducing surface incrustation by salt crystals during evaporation of a brine solution which comprises evaporating in an open evaporating vessel a substantially saturated brine solution containing a fraction of a percent by weight of the solution of a compound from the class consisting of polyoxyalkylene polyols having a terminal hydroxyl group attached to a terminal carbon atom at opposite ends of a polyoxyalkylene linear chain, their aliphatic monoethers wherein one of said terminal hydroxyl groups is replaced by an ether group, their aliphatic diethers wherein two of said terminal hydroxyl groups are replaced by ether groups, and their aliphatic amine condensation products wherein a hydrogen atom of an aliphatic amine from the group consisting of primary and secondary aliphatic amines is reacted with at least one of said terminal hydroxyl groups with the elimination of water, and which are characterized by polyoxyalkylene chains from the group consisting of polyoxyalkylene chains containing all oxyethylene groups, both oxyethylene and oxypropylene groups, and all oxypropylene groups, and have an average molecular weight such that the portion thereof attributable to oxyalkylene groups is at least 500, with the further proviso that the said compound is substantially insoluble in the brine solution under the conditions of evaporation, and said compound is mixed with a carrier, the quantity of said compound added to said solution being sufficient to reduce surface incrustation by salt crystals during the evaporation.

2. A method of manufacturing salt from an aqueous brine solution which comprises evaporating in an open evaporating vessel a substantially saturated brine solution containing a fraction of a percent by weight of the solution of a polyoxyalkylene polyol having a terminal hydroxyl group attached to a terminal carbon atom at opposite ends of a polyoxyalkylene linear chain consisting of oxyethylene and oxypropylene groups and having an average molecular weight attributable to oxyalkylene groups between about 2000 and 7000 with the further proviso that the weight ratio of oxyethylene groups to oxypropylene groups is in the range of about 1:22 to about 3:1 and said compound is mixed with a carrier, the quantity of said compound being sufficient to retard the formation of incrustation at the surface of the salt solution during evaporation.

3. A process of reducing surface incrustation by salt crystals during evaporation of a brine solution which comprises evaporating in an open evaporating vessel a substantially saturated brine solution containing a fraction of a percent by weight of the solution of a compound from the class consisting of polyoxyalkylene polyols having a terminal hydroxyl group attached to a terminal carbon atom at opposite ends of a polyoxyalkylene linear chain, their aliphatic monoethers wherein one of said terminal hydroxyl groups is replaced by an ether group, their aliphatic diethers wherein two of said terminal hydroxyl groups are replaced by ether groups, and their aliphatic amine condensation products wherein a hydrogen atom of an aliphatic amine from the group consisting of primary and secondary aliphatic amines is reacted with at least one of said terminal hydroxyl groups with the elimination of water, and which are characterized by polyoxyalkylene chains from the groups consisting of polyoxyalkylene chains containing all oxyethylene groups, both oxyethylene and oxypropylene groups, and all oxypropylene groups, and have an average molecular weight such that the portion thereof attributable to oxyalkylene groups is at least 500, with the further proviso that the said compound is substantially insoluble in the brine solution under the conditions of evaporation and said compound is mixed with a mixture of lower branched chain aliphatic alcohols and dipropylene glycol, the quantity of said compound added to said solution being sufficient to reduce surface incrustation by salt crystals during the evaporation.

4. A method of manufacturing salt from an aqueous brine solution which comprises evaporating in an open evaporating vessel a substantially saturated brine solution containing a fraction of a percent by weight of the solution of a polyoxyalkylene polyol having a terminal hydroxyl group attached to a terminal carbon atom at opposite ends of a polyoxyalkylene linear chain consisting of oxyethylene and oxypropylene groups and having an average molecular weight attributable to oxyalkylene groups between about 2000 and 7000 with the further proviso that the weight ratio of oxyethylene groups to oxypropylene groups is in the range of about 1:22 to about 3:1 and said compound is mixed with a mixture of lower branched chain aliphatic alcohols and dipropylene glycol, the quantity of said compound being sufficient to retard the formation of incrustation at the surface of the salt solution during evaporation.

5. A method of reducing surface incrustation by salt crystals during salt manufacture from a brine solution which comprises forming salt crystals by evaporating a substantially saturated salt solution in a grainer, and adding to the salt solution a fraction of a percent by weight of the solution of a polyoxyalkylene polyol having a terminal hydroxyl group attached to a terminal carbon atom at opposite ends of a polyoxyalkylene linear chain wherein the polyoxyalkylene chain contains only oxyethylene and oxy 1,2-propylene groups and has an average molecular weight of at least 2000, with the further proviso that the said compound is substantially insoluble in the brine solution under the conditions of evaporation, and said compound is mixed with a carrier, the quantity of said compound being sufficient to retard the formation of salt incrustation at the surface of the salt solution.

6. A method of reducing surface incrustation by salt crystals during salt manufacture from a brine solution which comprises forming salt crystals by evaporating a substantially saturated salt solution in a grainer, and adding to the salt solution a fraction of a percent by weight of the solution of a polyoxyalkylene polyol having a terminal hydroxyl group attached to a terminal carbon atom at opposite ends of a polyoxyalkylene linear chain wherein the polyoxyalkylene chain contains only oxyethylene and oxy 1,2-propylene groups and has an average molecular weight of at least 2000, with the further proviso that the weight ratio of ethylene oxide to 1,2-propylene oxide is approximately 1:3 and the said compound is substantially insoluble in the brine solution under the conditions of evaporation, and said compound is mixed with a carrier, the quantity of said compound being sufficient to retard the formation of salt incrustation at the surface of the salt solution.

7. A method of reducing surface incrustation by salt crystals during salt manufacture from a brine solution which comprises forming salt crystals by evaporating a substantially saturated salt solution in a grainer, and adding to the salt solution a fraction of a percent by weight of the solution of a polyoxyalkylene polyol having a terminal hydroxyl group attached to a terminal carbon atom at opposite ends of a polyoxyalkylene linear chain consisting of oxyethylene and oxypropylene groups and having an average molecular weight attributable to oxyalkylene groups between about 2000 and 7000 with the further proviso that the weight ratio of oxyethylene groups to oxypropylene groups is in the range of about 1:22 to about 3:1, and said compound is mixed with a carrier, the quantity of said compound being sufficient to retard the formation of salt incrustation at the surface of the salt solution.

References Cited in the file of this patent

UNITED STATES PATENTS

| | | |
|---|---|---|
| 2,575,276 | Jacoby et al. | Nov. 13, 1951 |
| 2,575,298 | Ryznar | Nov. 13, 1951 |
| 2,668,150 | Luvisi | Feb. 2, 1954 |
| 2,701,239 | Ryznar | Feb. 1, 1955 |
| 2,723,959 | Jacoby et al. | Nov. 15, 1955 |
| 2,762,780 | Kulakow | Sept. 11, 1956 |